(12) United States Patent
Dogan et al.

(10) Patent No.: US 10,540,076 B2
(45) Date of Patent: Jan. 21, 2020

(54) CLONE FEATURE TO COMPARE DATA VISUALIZATION

(71) Applicant: E-KALITE YAZILIM DONANIM MUHENDISLIK TASARIM VE INTERNET HIZMETLERI SAN. TIC. LTD. STI., Ankara (TR)

(72) Inventors: Ilter Tolga Dogan, Ankara (TR); Yasemin Sahin Dogan, Ankara (TR)

(73) Assignee: E-KALITE YAZILIM DONANIM MUHENDISLIK TASARIM VE INTERNET HIZMETLERI SAN. TIC. LTD. STI., Ankara (TR)

( * ) Notice: Subject to any disclaimer, the term of this patent is extended or adjusted under 35 U.S.C. 154(b) by 69 days.

(21) Appl. No.: 15/781,479

(22) PCT Filed: Sep. 27, 2016

(86) PCT No.: PCT/TR2016/050355
§ 371 (c)(1),
(2) Date: Jun. 5, 2018

(87) PCT Pub. No.: WO2018/063107
PCT Pub. Date: Apr. 5, 2018

(65) Prior Publication Data
US 2018/0364899 A1    Dec. 20, 2018

(51) Int. Cl.
*G06F 3/0484* (2013.01)
*G06Q 10/10* (2012.01)
(Continued)

(52) U.S. Cl.
CPC ........ *G06F 3/04847* (2013.01); *G06F 3/0483* (2013.01); *G06F 3/0485* (2013.01);
(Continued)

(58) Field of Classification Search
None
See application file for complete search history.

(56) References Cited

U.S. PATENT DOCUMENTS

| 5,920,315 A | 7/1999 | Santos-Gomez |
| 8,813,178 B1 * | 8/2014 | Khanna ................ G06Q 10/10 726/1 |

(Continued)

FOREIGN PATENT DOCUMENTS

| CN | 101622619 B | 3/2013 |
| EP | 2137643 A1 | 12/2009 |
| WO | 2008122830 A1 | 10/2008 |

OTHER PUBLICATIONS

Gartner, Gartner Says Business Intelligence and Analytics Leaders Must Focus on Mindsets and Culture to Kick Start Advanced Analytics, Sep. 15, 2015, https://www.gartner.com/newsroom/id/3130017.

*Primary Examiner* — Tuan S Nguyen
(74) *Attorney, Agent, or Firm* — Gokalp Bayramoglu

(57) ABSTRACT

A dashboard system for data visualizations for ICT and Business Intelligence (BI) comprises a method with the following steps:
When a clone button or other signifiers like a part of a dashlet is clicked, wherein the clone button or other signifiers are a dashboard part or a distinct visualization, which triggers clone on selection, another same dashboard or a clone is virtually created and displayed side by side in adjacent columns such as one column for each new clone in user interface,
Any criterion can be different for each clone,
When a user changes a criteria of a clone by controls over a visualization or using filters, only the clone is affected, (Continued)

When the user moves down or up with a mouse scroll or any sliding scrolling to browse through a page, page up-down or up-down arrows all clones move concurrently.
has been developed.

11 Claims, 4 Drawing Sheets

(51) Int. Cl.
    *G06Q 10/00* (2012.01)
    *G06F 3/0483* (2013.01)
    *G06F 3/0485* (2013.01)

(52) U.S. Cl.
    CPC ......... *G06F 3/04842* (2013.01); *G06Q 10/00* (2013.01); *G06Q 10/10* (2013.01)

(56) References Cited

U.S. PATENT DOCUMENTS

| | | |
|---|---|---|
| 2002/0008699 A1 | 1/2002 | Jou et al. |
| 2008/0275884 A1* | 11/2008 | Yoshida ................ G06Q 30/02 |
| 2009/0319931 A1 | 12/2009 | Hutchings et al. |
| 2010/0169794 A1 | 7/2010 | Kenna et al. |
| 2010/0211895 A1 | 8/2010 | Mistry et al. |
| 2011/0029579 A1 | 2/2011 | Lions |
| 2011/0261049 A1 | 10/2011 | Cardno et al. |
| 2014/0282145 A1 | 9/2014 | Dewan |
| 2016/0103872 A1 | 4/2016 | Prophete et al. |
| 2016/0188898 A1* | 6/2016 | Karinta ................ G06F 16/172 |
| | | 726/4 |

* cited by examiner

CLONE FEATURE TO COMPARE DATA VISUALIZATION

CROSS REFERENCE TO RELATED APPLICATIONS

This application is the national phase entry of International Application No. PCT/TR2016/050355, filed on Sep. 27, 2016, the entire contents of which are incorporated herein by reference.

TECHNICAL FIELD

This invention is related to data visualizations (from now data visualization will be called as dashboard) for software, ICT and Business Intelligence (BI).

BACKGROUND

The methods/techniques in the prior art for data visualizations (dashboards) implements the below steps;
1. Open dashboards in different windows
2. Change criteria for each dashboard window
3. Do one of the below
    Minimize all windows except for dashboards and use "Show windows side by side" or other compatible feature of operating system
    Use mouse to resize each window and span whole page side by side.

In the patent search which has been performed for the subject of the present invention, the documents U.S. Pat. No. 5,920,315, CN101622619 (B), US 2010/0211895 A1, US 2011/0029579 A1, US 2011/0261049 A1 have been determined.

In the document U.S. Pat. No. 5,920,315, "Multi-pane window with recoiling workspaces" has been disclosed. In this document an easier method is provided to create or destroy multiple windows in a screen. Each window having a resizable pane comprising multiple inner components. In document a method provided to have those windows without an overlap. When user creates or destroys a window new set of windows or other remaining windows span the space without overlap,
    While like U.S. Pat. No. 5,920,315 present invention also gives an easier way to span full window space, in U.S. Pat. No. 5,920,315 this is done only for using the Windows space more efficiently. In present invention main focus is on comparing visualizations.
    U.S. Pat. No. 5,920,315 includes different possible components in each window separate from other window components. In present invention all components are visualizations and each component has a copy (with possibly different filters) in each clone (except for composite charts)
    U.S. Pat. No. 5,920,315 is a method for horizontal and vertical spacing, while present invention vertically tiles all dashboards with horizontal grouping of copies of visualizations In the document CN101622619 (EP 2 137 643 and WO 2008/122830) "A computer implemented design tool for the navigation and visualization of data in at least one relational and/or multidimensional database" has been disclosed. The disclosed design tool allows a user to partition a display screen into a plurality of frames, to insert and configure controls within each frame to form a dashboard, the controls defining queries to the database(s) and any rules associated with those queries, and to create the dashboards in multiple levels for each of the frames. Configuring the controls permits a user to define drill actions for the controls within each dashboard to target dashboards in any of the multiple levels, both within the same frame as the starting dashboard, as well as in any or all of the other frames. The user defined drill actions provide for flexible multipath and multilevel navigation to achieve visualization of data in the database(s), by displaying on the display screen a respective target dashboard of any one of the multiple levels in each frame according to the controls selected by the user. The invention disclosed in the document CN101622619 is related to using a dashboard in a dashboard. The differences and advantages of the present invention are;
    While like CN101622619 present invention also shows several dashboards in a composite form in invention those dashboards are virtually created clones of the same root dashboard. In CN101622619 several different dashboards can be used in one screen,
    CN101622619 uses disclosed design to reuse several dashboards in one view. Present invention has a totally different focus on comparing visualizations side by side. Each clone represents same data same dashboard with different filters which give user easy ability to compare,
    In CN101622619 same filters are used for each dashboard, in present invention different filters can be used for each clone.

In the document US 2010/0211895 A1, a method, system and means have been disclosed. The method disclosed in this document includes defining a visualization dashboard, including defining at least one chart to include in the visualization dashboard and a range of data to occupy the at least one chart; defining data connections to at least one web service of a business application platform (AP); and specifying web service connections to a persistence of business intelligence data. The invention disclosed in this document is related to Business Intelligence (BI). The differences and advantages of the present invention are;
    Invention disclosed in this document is built upon similar state-of-art usage of data with a focus on connection to data sources (like web services), in present invention focus is not on data layer but on presentation layer. Innovation that makes present invention different is display of data not collection of data sources.

In the document US 2011/0029579 A1, a cloner is disclosed. The cloner is configured to assist users in deploying templates from a source environment into a target environment. The cloner includes a source identification module configured to identify source objects in a source environment from one or more business intelligence reports. The cloner also includes a mapping module configured to provide a declarative mapping screen showing the source objects and a list of available objects in a target environment to map the source objects against, and to receive mapping information selections from a user. The cloner further includes a duplication module configured to duplicate the one or more business intelligence reports into the target environment based on the mapping information selections. In this document a new copy is created by cloning. The differences and advantages of the present invention are;
    In the present invention no real clones are created, only virtual clones are created,
    In US 2011/0029579 A1 focus of invention is on copying the modules by creating a real mirror image of all elements with their connections, in present invention there is no copy operation since created clone is a virtual image without real objects, In present invention real value comes from comparison of clones, in US 2011/0029579 A1 value is about ease of creating same element so that user may make changes for creation of different new real modified elements.

In the document US 2011/0261049 A1 a data visualization system is disclosed. In the document "a method of creating a visual representation of data, the method including the steps of providing instructions to an end user to assist the end user in: constructing multiple graphical representations of data, where each graphical representation is one of a predefined type and includes multiple layers of elements that contribute to the end user's understanding of the data; arranging multiple graphical representations of different types within the visual representation in a manner that enables the end user to understand and focus on the data being represented; and displaying the visual representation" have been explained. The differences and advantages of the present invention are;

In the document the differences in the data are emphasized by color and the single cells are distinguished by the colors,
In the present invention not only single data cells but all dashboards are compared,
no real clones are created, only virtual clones are created, Disadvantages and Problems of
Techniques/Methods in Prior Art The disadvantages and problems of the techniques/methods in prior art are explained below;
1. It's not a one click solution, no one except expert users may even think of this.
2. It'll take time to do the configuration even for experts.
3. Windows will not move with up-down arrows or page up-down concurrently. If in a window user applies a page-down in other windows he'll need to do this to be able to compare all.
4. As dashboards are not guaranteed to be responsive they may not span whole windows and there will appear a horizontal slider in each windows. This makes comparison not only hard but also nearly impossible. Since user will need to do any move operation in each windows one by one.

SUMMARY

In the present invention, it is aimed to develop a method for dashboards (data visualizations);
to compare changes in dashboards' visualizations by side by side by presentation with synchronized vertical scrollbar and no horizontal scrollbar (responsive fit to width for each clone),
to make it possible or at least significantly ease the process of comparing different criteria in same dashboard by cloning it vertically on same medium (like screen or attached screens).

For the dashboard users; there is a need to compare different parameters on same dashboard. But as there is no option or just a hard way to do it most dashboard users aren't even aware of possibility of comparing different parameters side by side.

According to Gartner (http://www.gartner.com/newsroom/id/3130017) 60 percent of business intelligence projects "fail to go beyond piloting and experimentation, and will be abandoned". This is because users cannot make use of dashboards for their needs. Which is a signal that easing the functionality for core use of a business intelligence dashboard would make great positive effect on usefulness.

User necessities mostly are about comparing different states of same data source. This means different criteria (criteria, filters, parameters will be used in document interchangeably) set to different values in same dashboards that is linked to same data source are usually compared by users. Users typically try to reach insights by comparing a branch with others, or a time of year to same period in last year. So as comparison of states (filter sets) is a core use, improving UX on that would be of significant value for most users.

By the present invention;
The dashboard users see effect of different parameters side by side, easily without an effort,
It is possible for users to see the real use of business intelligence and use it easily.

BRIEF DESCRIPTION OF THE DRAWINGS

Definition of the Figures

In order to describe the clone feature to compare data visualization better which is developed in this invention, the attached Figures have been prepared and their general explanations are presented below. Details of invention on figures will be given in next section Definition of Features Description of references on all figures are explained below;
(Ref1): Global criteria that can be selected
(Ref2): Already selected criteria
(Ref3): ACTION-A general clone: Dashboard general clone button
(Ref4): This ACTION (ACTION-A) is used for switching from FIG. 1 to FIG. 2
(Ref5): Dashboard which is a bundle of data visualizations that are filtered in global criteria
(Ref6): Selection specific dashlet controls
(Ref7): General dashlet controls
(Ref8): Selection with mouse click. In this visualization selection is shown as a hovered part within pie chart
(Ref9): ACTION-B selection clone: In-dashlet, selection specific clone button
(Ref10): Selected criteria (note they are different in each clone), See Ref2 for ordinary dashboard version
(Ref11): Global criteria for each clone. See Ref1 for ordinary dashboard version.
(Ref12): Parts of dashboard to show visualization for each clone. All parts (except OPTIONAL-B below) are shown vertically in a column for each clone. See Ref5 for ordinary dashboard version.
(Ref13): OPTIONAL-A: Showing percent differences with reference to left clone
(Ref14): OPTIONAL-B: Showing composite/concatenated charts. This will work only for charts having one measure/dimension
(Ref15): OPTIONAL-C: Y axis max value can be set the same or left free (as here). If they are set same Clone2/Dashlet1 would have max Y as 90 as Clone1/Dashlet1
(Ref16): See only dim1.a and dim1.e selected for that clone, all vertical dashlets affected
(Ref17): This ACTION (ACTION-B) is used for switching from FIG. 2 to FIG. 3. See Ref9 for same action in ordinary dashboard.

(Ref18): See only dim1.e selected for left selection clone
(Ref19): See other unselected item (dim1.a) selected for right selection clone
(Ref20): If turned off all settings below become disabled

DEFINITION OF THE FEATURES SHOWN ON THE FIGURES

In order to better explain the clone feature to compare data visualization which is developed with this invention, the parts (pieces) shown in the figures have been separately numbered and each part has been described below.

Figure 1:
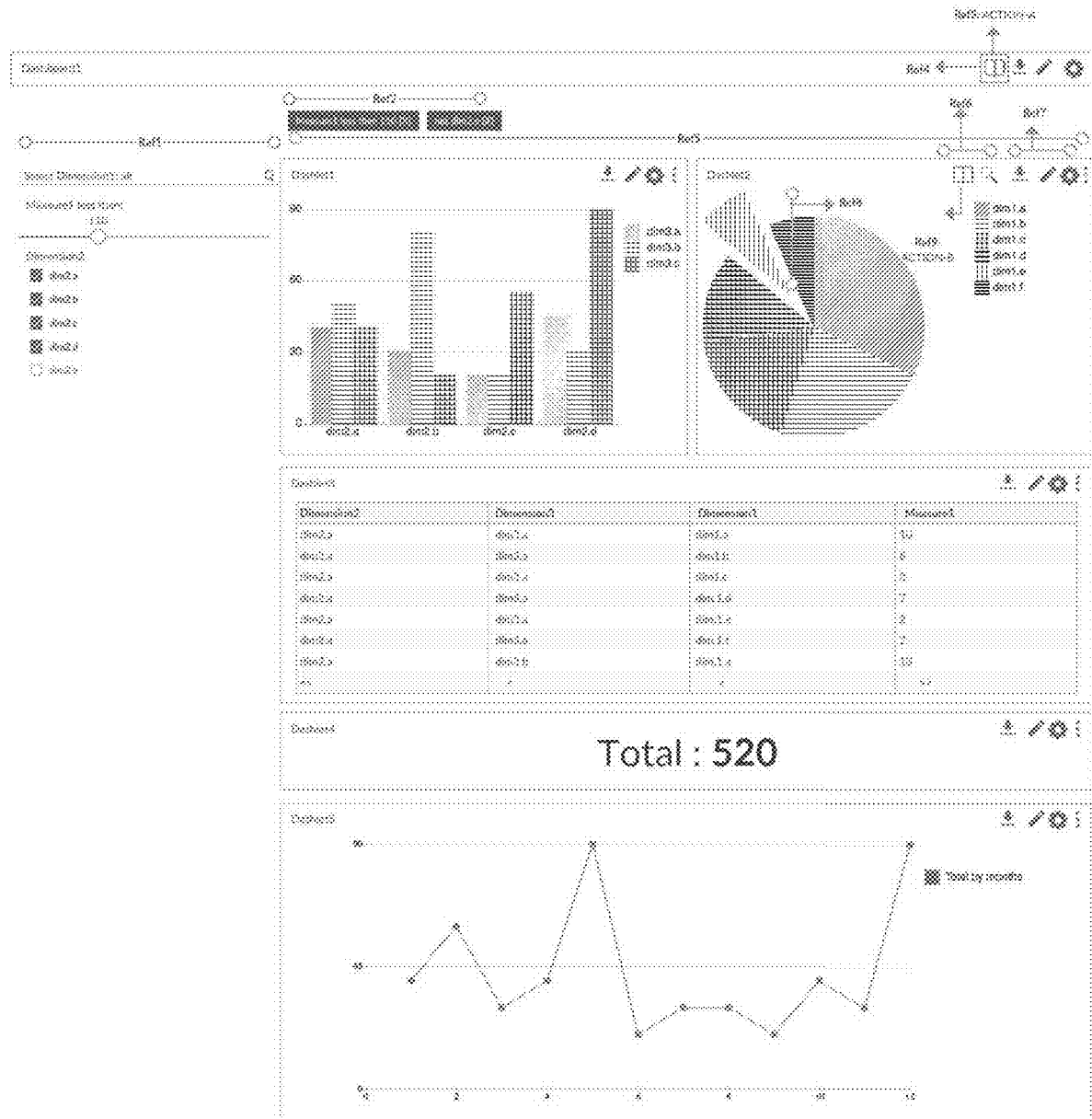
FIG. 1 illustrates an ordinary dashboard and its parts which are prerequisite to understand invention, described in this section.

FIG. 1:
  a. Except for the two actions all in this figure can be seen in an ordinary dashboard. There are 2 actions (ACTION-A and ACTION-B) to switch to clone mode from ordinary dashboard.
  b. ACTION-A general clone is in main dashboard menu, placed in topright corner of figure. When it's clicked two dashboards with same parameters will be opened side by side. Their parameters can change which gives user ability to compare. See FIG. 2 for more information.
  c. ACTION-B selection clone is shown in dashlets in which a parameter with a connected filter is chosen. In FIG. 1 in Dashlet2 dim.1.e is selected and this makes ACTION-B visible. If it was clicked there will be another clone created including dim.1.e and current dashboard will be the left clone with all dim.1 items without dim.1.e.

Figure 2:
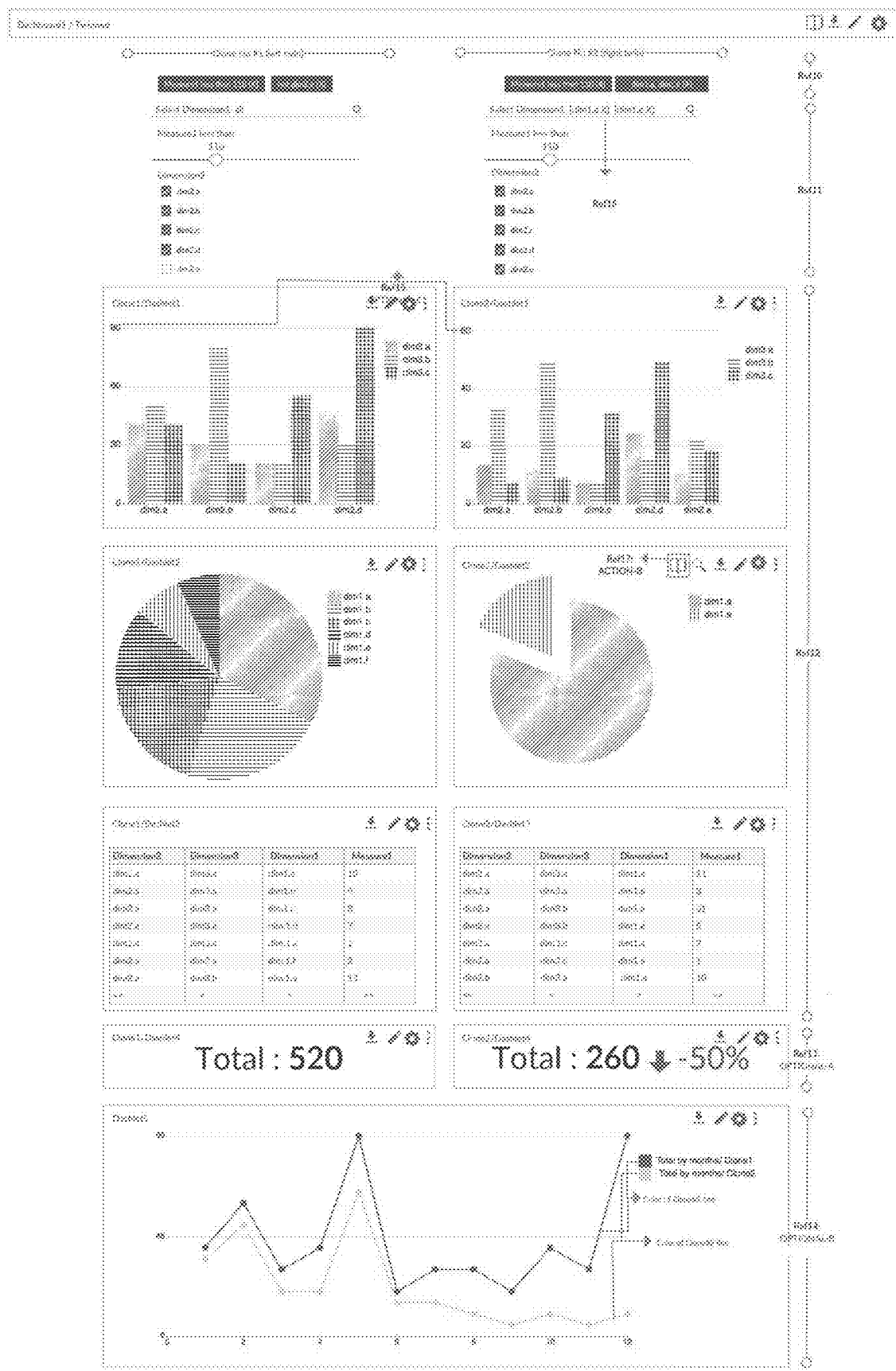
FIG. 2 This figure shows the dashboard given in FIG. 1 in cloned mode. ACTION-A in top-right of FIG. 1 is used. Then several filters are changed in right twin. As most items about this image are in scope of invention they will be described in next section. OPTIONAL (tagged as A, B, C) items are shown also in that figure.
Figure 3:
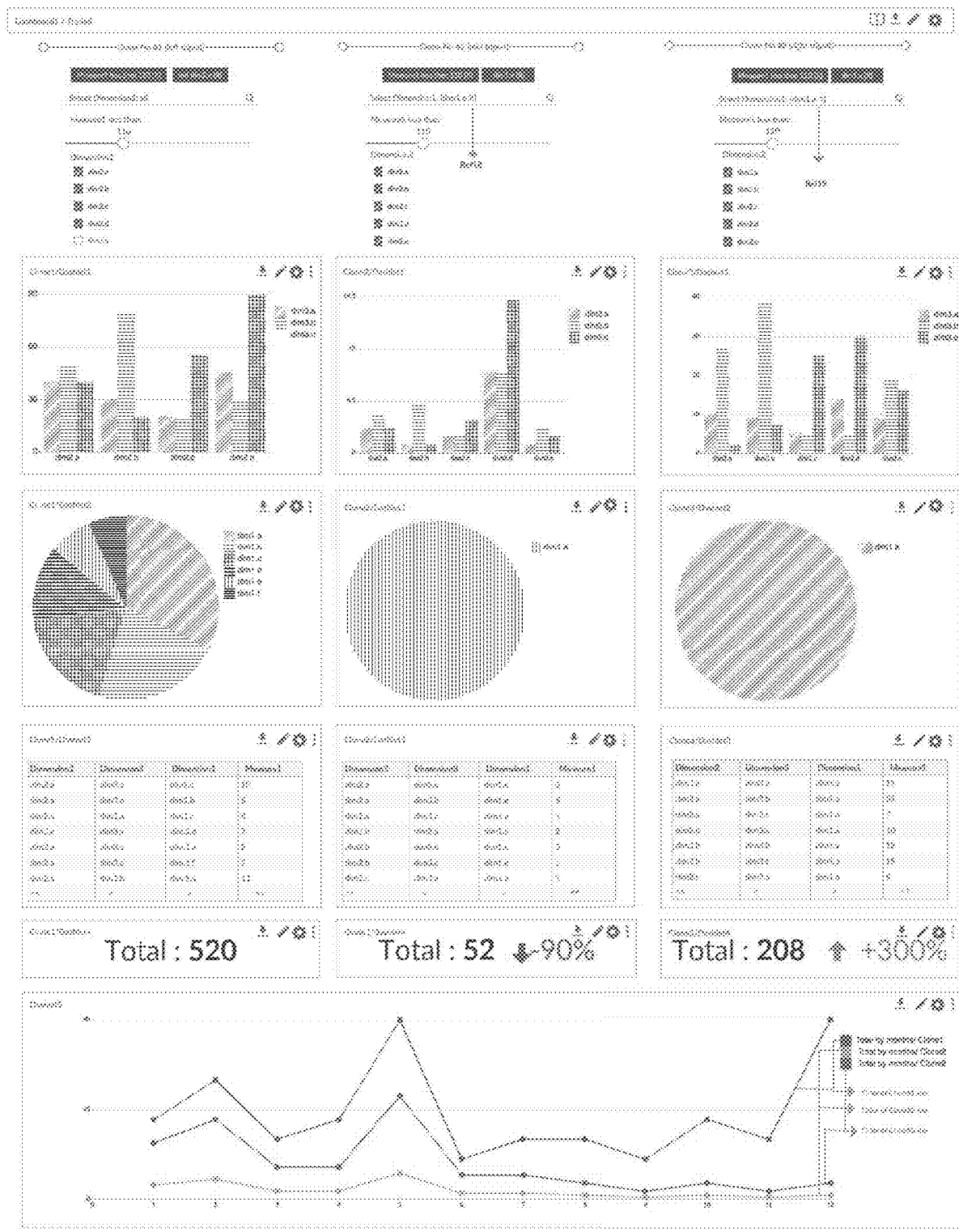
FIG. 3 This figure shows the dashboard given in FIG. 2 in filter cloned mode. Clone button in Clone2/Dashlet2 (ACTION-B in FIG. 1) is used and without any further operation it shows FIG. 3. As most items about this image are in scope of invention they will be described in next section.
Figure 4:
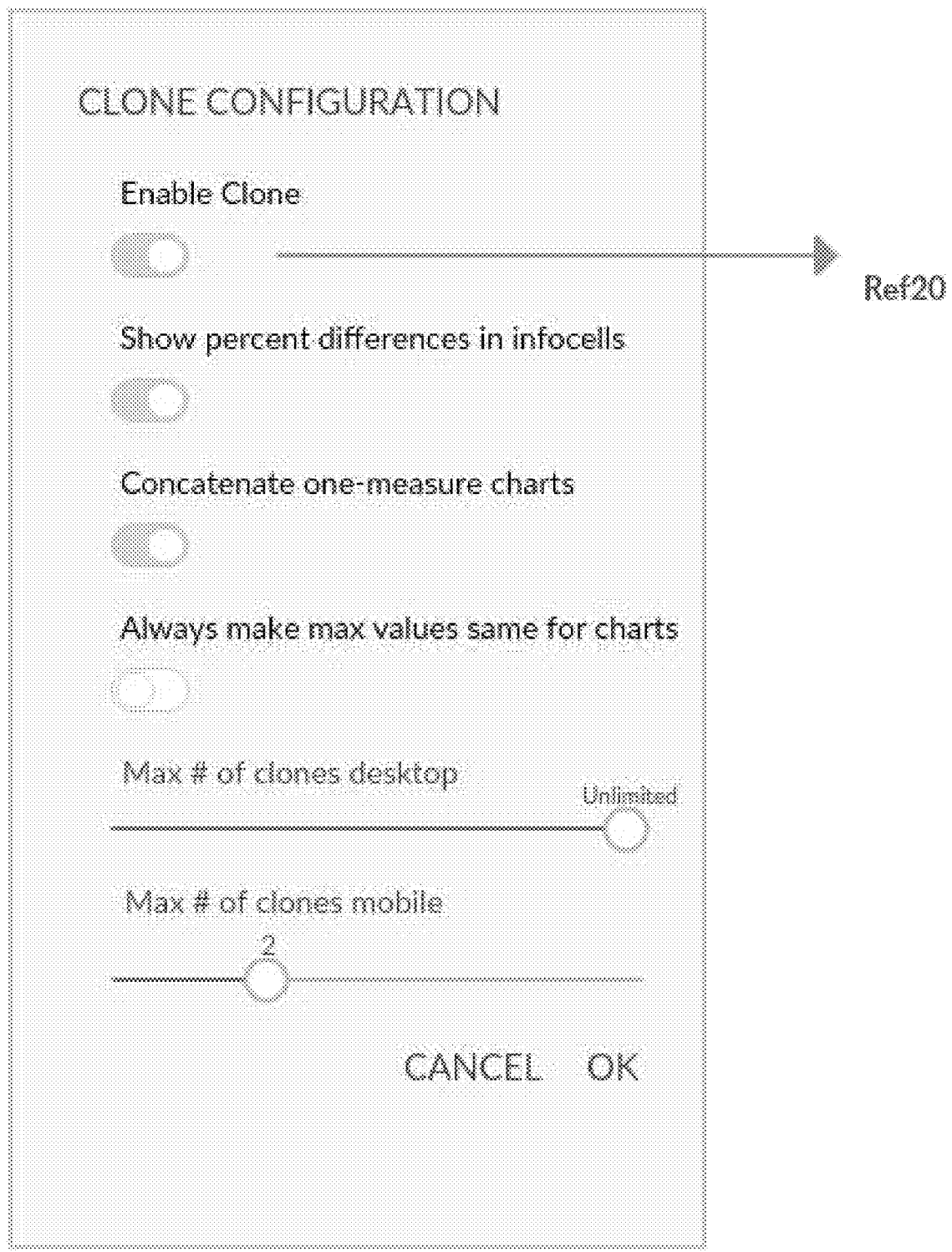
FIG. 4 In Clone Configuration screen clone ability can be turned on-off and several configuration items can be switched.

FIG. 2:
  a. There are 2 clones in that figure and Twinned is added at the end of dashboard name.
  b. Clone no #1, Clone no #2: Same widgets are shown one after other vertically with different filters. Widgets are shown on same horizontal space side by side which gives user easy ability to compare.
  c. Selected criteria: In same horizontal space selected filters (or criteria) are shown. Note that in left there is "not dim2.e" in right there is "dim1.a, dim1.e".
  d. Global criteria for each twin: Controls to change criteria in each of the clones. Each clone has its own Global criteria part so user can change each separately.
  e. Parts of dashboard: Changed widgets that are shown in same horizontal space side by side. Each clone's widget is filtered by it's own criteria. Each dashlet has Clone name at the beginning.
  f. OPTIONAL A: Showing percent differences with reference to left clone. See Dashlet4. This is shown only for dashlets that show a number. In addition to showing percent differences colors and arrows also can be used to show how a numeric figure is changed with respect to left clone. In figure There is an arrow, down for decrease, up for increase. Color of arrow and percent difference is red for decrease green for increase. Other possible indicators can be used to show numerical differences like depth of color (red or green) to change via change in percent.
  g. OPTIONAL B: Showing composite concatenated charts. See Dashlet5. This will work only for charts having one measure/dimension and one X and Y axis. So there should be one number in measure axis (generally Y axis, unless user decides to show dimensions from top to bottom rather than left to right) for each number in dimension axis (generally X axis). This will work only in charts with one measure/dimension (one plot like columns, bars, line, area, histogram in one X and Y axis). With this optional-on-clone will merge multiple lines/bars/columns into one chart by plotting each chart over one composite chart sharing same X and Y axes. Unlike all other dashlets which are cloned under each column separated for each clone this composite chart won't be separated into clone columns but will span whole width. In this case it will create a composite chart of same type (if column composite column if line composite line etc.). One line will be changed to 2 lines. If it's a column chart composite will show grouped columns like in Dashlet1 but each item in groups will represent a clone.
  2 dimension charts (see Dashlet1) excluded since it's not proper to have a composite of two 2 dimensional charts. It would be the same if chart has one dimension but 2 measures. Pie (see Dashlet2) is excluded since there is no X or Y axis.
  h. OPTIONAL C: Y axis max value set to same for each dashlet. See Dashlet1 (in this example each Y max are set free so this option is not enabled). Same max value would make it easy to compare dashlets side by side). To compare dimension measures directly to other clones in same row, user will be able to choose to see same Y length for each of the clones with global maximum for all cloned charts in same row set to each of the chart. If this option is not set user will see different max Y for each clone which would make it easy to see differences for the measure of dimensions within each cloned chart but harder to understand real quantitative difference between cloned charts of same row. If this mode was open both dashlets would show 90 and Clone2/Dashlet1 will be shown significantly smaller than Clone1/Dashlet1
  i. See Clone2/Dashlet2 dim1.e is selected and selection clone button is shown on ribbon menu of dashlet. Rather than using a global signifier (button) to create a clone user will be able to create a comparison case by easy-creating a clone with and without selected dimension by using clone on selection signifier. FIG. 3 is created with that action.

FIG. 3:
  a. There are 3 clones in that figure and Tripled is added at the end of dashboard name.
  b. See Clone2 and Clone3 selected criteria. dim.1e is selected in Clone2 and it's exclusion dim. 1.a is left for new Clone3.
  c. See Dashlet2 in Clone2 and Clone3. Both shows one dimension item. Typically left clone created after selection would show one dimension item since it's selected in that dashlet. But in that example there is only one other dimension item so Clone3/Dashlet2 also shows one dimension item.
d. OPTIONAL A: Clone3/Dashlet4 is showing percent change with respect to it's left adjacent clone.
e. OPTIONAL B: Now there is 3 lines in Dashlet5 due to new clone.
f. OPTIONAL C: As max Y are not set to same (this option is not on) each Dashlet1 showing it's values with another max Y.

DETAILED DESCRIPTION OF THE EMBODIMENTS

FIG. 1

A sample data visualization in a dashboard is shown. A dashboard is a data visualization tool that is comprised of
  a. Dimensions are groups of data, in figure there are 3 dimensions: Dimension1, Dimension2, Dimension3. Each dimension have items (group names) starting with lower case dim than ending number of dimension than an alphabetical character. Examples of sample dimensions can be Gender, Department their dimension items to be {Male, Female, Unknown} and names of product categories like {Smart Phone, Tablet, Other Phone, Accessory}.
  b. Measures are numerical property of an item. In filters measures can be property of distinct records or aggregates. In visualization if shown by dimensions they are usually aggregate values from aggregate functions like average, sum, max, min etc. Eg. in FIG. 1 Dashlet1 dim2.d-dim3.c shows a number 90. There is an aggregate selected when dashlet is created and it's applied to all records having items dim2.d-dim3.c at the same time. If measure is daily sales number and aggregate is average this would mean 90 is average sales quantity for dim2.b (eg. Tablet) and dim3.a (eg. Female gender)
  c. Several widgets that show data in different forms (like table or graph). There are 5 widgets in figure Dashlet1: a histogram (column chart), Dashlet2: a pie chart, Dashlet3: a table, Dashlet3: an infocell showing a measure aggregate and Dashlet5: A line chart with month dimension.
  d. A filtering mechanism (or several filtering mechanisms) to filter data according to selected parameters. In figure filtering is shown in left pane. But this may change place. Or filtering may be implemented within widgets and may be triggered by selections within the widget. On left pane there is "Global criteria that can be selected" which is an obvious part for filtering. Also in Dashlet2 dim.1.e is selected and popped out of pie chart. If user clicks on the magnifier icon on "Selection specific dashlet controls" part it will add that element and filter all dashlets accorgind to that selection. Several controls given on left pane are:
    a. In "Select Dimension1" all is selected by default. This filter is autocomplete and multiple items can be added.
    b. In "Measure1 less than" there is a slider to limit quantity measure to a maximum value. There can also be a slider or several boxes to limit a measure.
    c. In "Dimension2" there is a checkbox list.
  e. "Already selected criteria": Selections done by user before are listed on top of dashboard. This gives user a clear sight of what data portion is being seen. User can reset a filter by clicking X near that boxes or removing selection from "Global criteria that can be selected"
  f. For each dashlet there are "General dashlet controls" (see Dashlet2), as functions of those buttons is out of scope of this text they will not be explained.

The method of solution by this invention is summarized below;
ROOT
1. In a dashboard which has cloning ability, there will be a signifier (a perceivable indicator that shows an action will be triggered by its use like a button or a link, in document mostly button will be used instead of signifier) that will be called "Clone" (or twin or any term that defines ability). See FIG. 1—ACTION-A.
2. When that button is clicked two same dashboards (clones) will be shown side by side in adjacent columns, but not in different windows but in same window. These clones will be responsive (there won't be more than one dashlet (dashboard part, a distinct visualization will be called as dashlet throughout the document) in one row per each clone) See FIG. 2—Clone no#1, Clone no#2.
3. Criteria sets have a scope different for each clone. This can be shown on top of each clone. There won't be global criteria, but criteria will be limited to sisters. See FIG. 2—Selected criteria
4. User will easily be able to change criteria, only that clone will be affected.
5. When user moves down or up with mouse scroll, page up-down or up-down arrows all sisters will move concurrently to make sure that in one row user can compare changes in a dashlet with respect to each other clone.
All Optional additions require ROOT.
OPTIONAL-A
  1. "DEFINITION OF THE FEATURES SHOWN ON THE FIGURE" FIG. 2
OPTIONAL-B
  1. "DEFINITION OF THE FEATURES SHOWN ON THE FIGURE" FIG. 2
OPTIONAL-C
  1. "DEFINITION OF THE FEATURES SHOWN ON THE FIGURE" FIG. 2
OPTIONAL-D
  1. On widget filters will have another button to clone compare with or without that filter. See FIG. 1 ACTION-B and FIG. 2 Clone2/Dashlet2. Definition of that feature given in "DEFINITION OF THE FEATURES SHOWN ON THE FIGURE" FIG. 1
OPTIONAL-E
  1. Number of clones can be limited. After triplet there will be another clone button (ACTION-A of FIG. 1) to make it quadruplet. And if this limit is set to 4 there won't be clone button if there is already 4 clones.
  2. This limit can change via environment. In mobile another max limit can be set. If max for mobile is set to 2 there won't be ACTION-A button in mobile if there is 2 clones.
OPTIONAL-F
  1. For mobile cloning will ask user to move the device to horizontal position if it's in vertical position to make sure user can use cloning optimally in any device.
Real World Example:
Say it's a dashboard for a store selling mobile devices.
dim1 to be different sales reps. dim1.a being Ann, dim1.e being Eric.
dim2 to be product categories dim2.a smart phones, dim2.b phones; dim2.c tablets, dim2.d accessories, dim2.e other.

dim3 to be customer group, dim3.a female; dim3.b male, dim3c children

See FIG. 3.
1. Dashlet5 clearly shows Ann and Eric did not do well at the sales of December with respect to other sales reps. Clone2
2. Dashlet1 comparison shows:
   a. Clone2/Dashlet1: Eric is best at selling accessories, more to children.
   b. Clone3/Dashlet1 Ann is better selling phones to men, also do some tablet+accessories sales to mostly children.
   c. Clone1/Dashlet1: Accessories often bought by children so Eric's accessories sale is not special, he should not be thought as a better rep for children since children mainly buy accessories. Seeing similar pattern in a clone makes it easier to reach insights otherwise one can think Eric was a better sales rep for children.
3. Clone3/Dashlet3 clearly shows Ann is selling 300% more than Eric.

As a summary, in this invention;

A Dashboard system for data visualizations for ICT and Business Intelligence (BI) has been developed. The system comprises the method which comprises following steps;

When the clone button or other signifiers (like a part of a dashlet (dashboard part, a distinct visualization) that trigger clone on selection) is clicked, another same dashboard (a clone) is virtually created and displayed side by side in adjacent columns (one column for each new clone) in user interface, Any criterion can be different for each clone, When the user changes the criteria of a clone by controls over a visualization or using filters, only that clone is affected, When user moves down or up with mouse scroll or any sliding scrolling to browse through page, page up-down or up-down arrows all clones move concurrently.

In the Dashboard system developed in this invention the percent differences are shown with reference to left clone on single numeric figure and in addition to showing percent differences colors and arrows also can be used to show how a numeric figure is changed with respect to left clone, Green and/or Up arrow can be used for increase, Red and/or Down arrow can be used for decrease.

Additionally in the Dashboard system developed in this invention the composite concatenated charts are shown for charts having one measure/dimension (one plot like columns, bars, line, area, histogram in one X and Y axis) and optionally clone system may have ability to merge multiple lines/bars/columns into one chart by plotting each chart over one composite chart sharing same X and Y axes, and this composite chart won't be separated into clone columns but will span whole width.

In the Dashboard system developed in this invention, the system has an option to have Y axis max value set to same for each dashlet in same row (same dashlet in different clones) and optionally to be able to compare dimension measures directly to other clones in same row, user will be able to choose to see same Y length for each of the clones with global maximum for all cloned charts in same row set to each of the chart, and if this option is not set user will see different max Y for each clone which would make it easy to see differences for the measure of dimensions within each cloned chart but harder to understand real quantitative difference between cloned charts of same row.

In the Dashboard system developed in this invention the system comprises filters having another clone to compare with or without that filter, on dashlet by directly creating a clone on a selection and rather than using a global signifier (button) to create a clone user will be able to create a comparison case by easy-creating a clone with and without selected dimension by using clone on selection signifier.

The invention claimed is:

1. A dashboard system for data visualizations for ICT and Business Intelligence (BI), comprising a processor configured to perform a method, wherein the method comprises the following steps;
   when a clone button or a part of a dashlet is clicked, wherein the dashlet is a dashboard part or a distinct visualization that triggers a clone on a selection, another same dashboard or a clone is virtually created and displayed side by side in adjacent columns such as one column for each new clone in a user interface,
   any criterion is different for each clone,
   when a user changes a criteria of the clone by controls over a visualization or using filters, and only the clone is affected,
   when the user moves down or up with a mouse scroll or any sliding scrolling to browse through a page, page up-down or up-down arrows all the clones move concurrently.

2. The dashboard system of claim 1, wherein percent differences are shown with reference to a left clone on a single numeric figure and in addition showing percent differences, colors and arrows are used to show how the numeric figure is changed with respect to the left clone, Green and/or Up arrow are used for increase, Red and/or Down arrow are used for decrease.

3. The dashboard system of claim 2, wherein composite concatenated charts are shown for charts having one measure/dimension, and the charts are selected from the group consisting of columns, bars, line, area and histogram in one X and Y axis, and optionally the dashboard system is configured to merge multiple lines/bars/columns into one chart by plotting each chart over one composite chart sharing same X and Y axes, and wherein the composite chart sharing the same X and Y axes is not separated into clone columns but spans a whole width.

4. The dashboard system of claim 2, wherein having an option of Y axis max value sets being the same for each dashlet in a same row, a same dashlet in different clones, and optionally to compare dimension measures directly to other clones in the same row, the user will be able to choose to see the same Y length for each of the clones with a global maximum for all cloned charts in the same row sets to each of the cloned chart, and when the option is not set, the user will see a different max Y for each clone.

5. The dashboard system of claim 2, wherein the dashboard system comprises filters having another clone to compare with or without a corresponding filter, on the dashlet by directly creating the clone on the selection rather than using a global signifier to create the clone, the user will be able to create a comparison case by easy-creating the clone with and without selecting a dimension by using the clone on a selection signifier.

6. The dashboard system of claim 1, wherein composite concatenated charts are shown for charts having one measure/dimension, and the charts are selected from the group consisting of—columns, bars, line, area and histogram in one X and Y axis, and optionally the dashboard system is configured to merge multiple lines/bars/columns into one chart by plotting each chart over one composite chart sharing same X and Y axes, and wherein the composite chart sharing the same X and Y axes is not separated into clone columns but spans a whole width.

7. The dashboard system of claim 6, wherein having an option of Y axis max value sets being the same for each dashlet in a same row, a same dashlet in different clones, and optionally to compare dimension measures directly to other clones in the same row, the user will be able to choose to see the same Y length for each of the clones with a global maximum for all cloned charts in the same row sets to each of the cloned chart, and when the option is not set, the user will see a different max Y for each clone.

8. The dashboard system of claim 6, wherein the dashboard system comprises filters having another clone to compare with or without a corresponding filter, on the dashlet by directly creating the clone on the selection rather than using a global signifier to create the clone, the user will be able to create a comparison case by easy-creating the clone with and without selecting a dimension by using the clone on a selection signifier.

9. The dashboard system of claim 1, wherein having an option of Y axis max value sets being the same for each dashlet in a same row, a same dashlet in different clones, and optionally to compare dimension measures directly to other clones in the same row, the user will be able to choose to see the same Y length for each of the clones with a global maximum for all cloned charts in the same row sets to each of the cloned chart, and when the option is not set, the user will see a different max Y for each clone.

10. The dashboard system of claim 9, wherein the dashboard system comprises filters having another clone to compare with or without a corresponding filter, on the dashlet by directly creating the clone on the selection rather than using a global signifier to create the clone, the user will be able to create a comparison case by easy-creating the clone with and without selecting a dimension by using the clone on a selection signifier.

11. The dashboard system of claim 1, wherein the dashboard system comprises filters having another clone to compare with or without a corresponding filter, on the dashlet by directly creating the clone on the selection rather than using a global signifier to create the clone, the user will be able to create a comparison case by easy-creating the clone with and without selecting a dimension by using the clone on a selection signifier.

\* \* \* \* \*